(12) United States Patent
Furuichi et al.

(10) Patent No.: US 6,527,397 B2
(45) Date of Patent: Mar. 4, 2003

(54) PROJECTOR

(75) Inventors: Kunitaka Furuichi, Tokyo (JP); Jun Ogawa, Tokyo (JP)

(73) Assignee: NEC Viewtechnology, Ltd., Tokyo (JP)

(*) Notice: Subject to any disclaimer, the term of this patent is extended or adjusted under 35 U.S.C. 154(b) by 0 days.

(21) Appl. No.: 09/919,861

(22) Filed: Aug. 2, 2001

(65) Prior Publication Data

US 2002/0018187 A1 Feb. 14, 2002

(30) Foreign Application Priority Data

Aug. 8, 2000 (JP) .................................... 2000-240164

(51) Int. Cl.[7] ........................... G03B 21/14; G03B 21/22
(52) U.S. Cl. ............................................. 353/119; 353/98
(58) Field of Search ........................... 353/119, 64, 73, 353/78, 99, 98

(56) References Cited

U.S. PATENT DOCUMENTS

| | | | | |
|---|---|---|---|---|
| 3,225,650 A | * | 12/1965 | Wright | 352/104 |
| 3,733,121 A | * | 5/1973 | Smitzer | 353/23 |
| 4,111,149 A | * | 9/1978 | Wells | 353/101 |
| 5,033,842 A | * | 7/1991 | Tam | 353/119 |
| 5,404,185 A | * | 4/1995 | Vogeley et al. | 349/6 |
| 5,622,417 A | * | 4/1997 | Conner et al. | 353/102 |

FOREIGN PATENT DOCUMENTS

JP    11-125865    5/1999

* cited by examiner

Primary Examiner—Russell Adams
Assistant Examiner—D. Ben Esplin
(74) Attorney, Agent, or Firm—Sughrue Mion, PLLC

(57) ABSTRACT

All of optical elements constituting a projecting optical system 10 are reflection mirrors 1 to 4. The reflection mirrors 1 to 4 are arranged in a plate-shaped support member 6 with a relative positional relation between the reflection mirrors being fixed. A position of the whole projecting optical system 10 with respect to an image-forming component 5 is adjust by moving the support member 6.

4 Claims, 4 Drawing Sheets

PROJECTOR

BACKGROUND OF THE INVENTION

1. Field of the Invention

The present invention relates to a projector and, more particularly, to a projector in which all of optical elements constituting a projection optical system are constituted with reflection mirrors.

2. Description of the Prior Art

As a projector, a liquid crystal projector is widely used as a compact projector in which liquid crystal display elements are used as an image-forming component.

FIG. 1A illustrates an example of a conventional liquid crystal projector and FIG. 1B shows its optical system schematically.

As shown in FIG. 1B, the conventional liquid crystal projector has a casing 23 in which a light source 20 as an illumination source, a liquid crystal display panel 21 and a focusing optical system 22 are housed. The focusing optical system 22 is mounted on an internal side surface of the casing 23.

Light emitted from the light source 20 is incident on the liquid crystal display panel 21 and modulated with an image formed in the liquid crystal display panel 21. The modulated light is expanded by the focusing optical system 22 to reproduce an enlarged image on a screen 24. Incidentally, the liquid crystal display panel 21 used in this example is of the transmission type.

In the conventional liquid crystal projector shown in FIG. 1B, however, projection light is derived out from the focusing optical system 22, which is disposed in an exit portion of the casing 23. The focusing optical system 22 is constructed with a plurality of refractive optical elements such as lenses and fixed suitably in the casing 23 so that an external preciseness of the respective refractive optical elements within the focusing optical system is Maintained. An adjustment for a focal point of the projecting optical system is performed by merely moving a portion of the focusing optical system.

On the other hand, a focusing optical system disclosed in JP H11-125865 A is an eccentric optical system using reflective optical elements. In such focusing optical system, an image quality is degraded due to an arranging error of the respective reflective optical elements, particularly, distance error between the reflective optical elements, and the angle error thereof. It is also difficult to predict stray light within the casing. Accordingly, a monolithic construction in which all of the reflective optical elements constituting the focusing optical system are arranged in one casing is employed.

However, in order to adjust the focus point by a movement of one reflection mirror, it is necessary to mount the reflective optical elements in the casing while maintaining mounting precision. Since it is further necessary to support the reflective optical elements with high mounting precision thereof during the focal point control, the supporting mechanism of the reflective optical elements and the focal point adjustment mechanism becomes complicated, therefore, the resultant projector is expensive.

SUMMARY OF THE INVENTION

An object of the present invention is to provide a projector, which does not require any mutual adjustment of reflective optical elements constituting a focusing optical system of the projector after these elements are assembled.

In order to achieve this object, a projector according to the present invention having a projecting optical system for projecting light from image forming elements onto a screen features all of optical elements constituting the projecting optical system being reflective optical elements, respectively. And a position of the whole projecting optical system is adjustable with respect to an image-forming component of the projector by arranging the reflective optical elements on a plate-shaped support member with relative positional relation thereof being fixed and moving the support member.

The reflective optical elements are preferably reflection mirrors, respectively. Furthermore, the present invention features the reflective optical elements being fixed to the plate-shaped support member by inserting the reference pins into the respective reference holes provided on the reflective optical elements and the support member.

Alternatively, the present invention features providing fitting holes in the plate-shaped support member. Each fitting hole has a configuration contoured correspondingly to an outer configuration of a fitting portion of each reflective optical element such that the reflective optical element is fixed onto the plate-shaped support member by fitting the reflective optical elements in the respective fitting holes of the support member.

Alternatively, the present invention features the reflective optical elements being arranged on the support member with the relative positional relation between the reflective optical elements on the support member being fixed, by providing abutment portions each confronted with a fitting portion of each reflective optical element, with which the reflective optical element is fixed onto the plate-shaped support member, in the support member and confronting the fitting portions of the reflective optical system with the respective abutment portions of the support member.

Furthermore, the present invention features a light shield for removing stray light of a light beam from an image-forming element and an iris portion for removing useless light contained in the light beam in the projecting optical system being provided on the plate-shaped support member on which the reflective optical elements are arranged.

DETAILED DESCRIPTION OF THE PREFERRED EMBODIMENTS

Figure 1A:
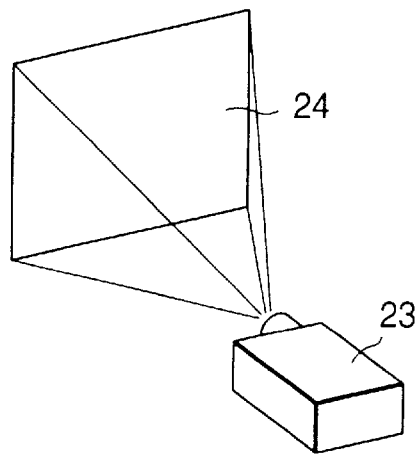
FIG. 1A is a schematic perspective view of an example of a conventional liquid crystal projector system.
Figure 1B:
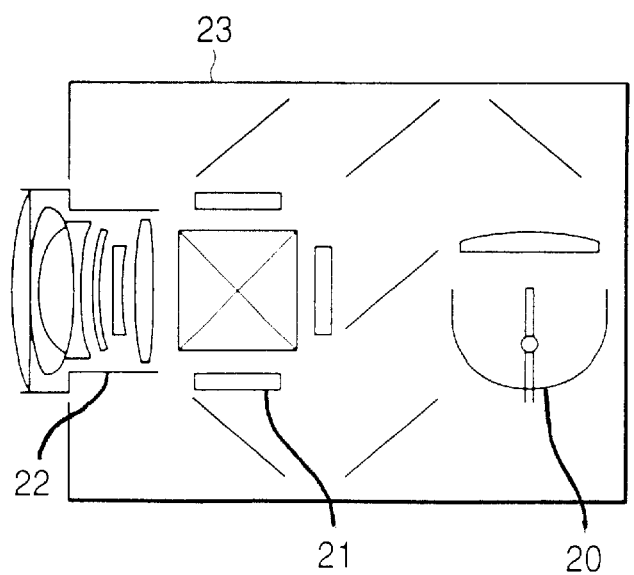
FIG. 1B is a schematic plan view of a liquid crystal projector shown in FIG. 1A.
Figure 2:
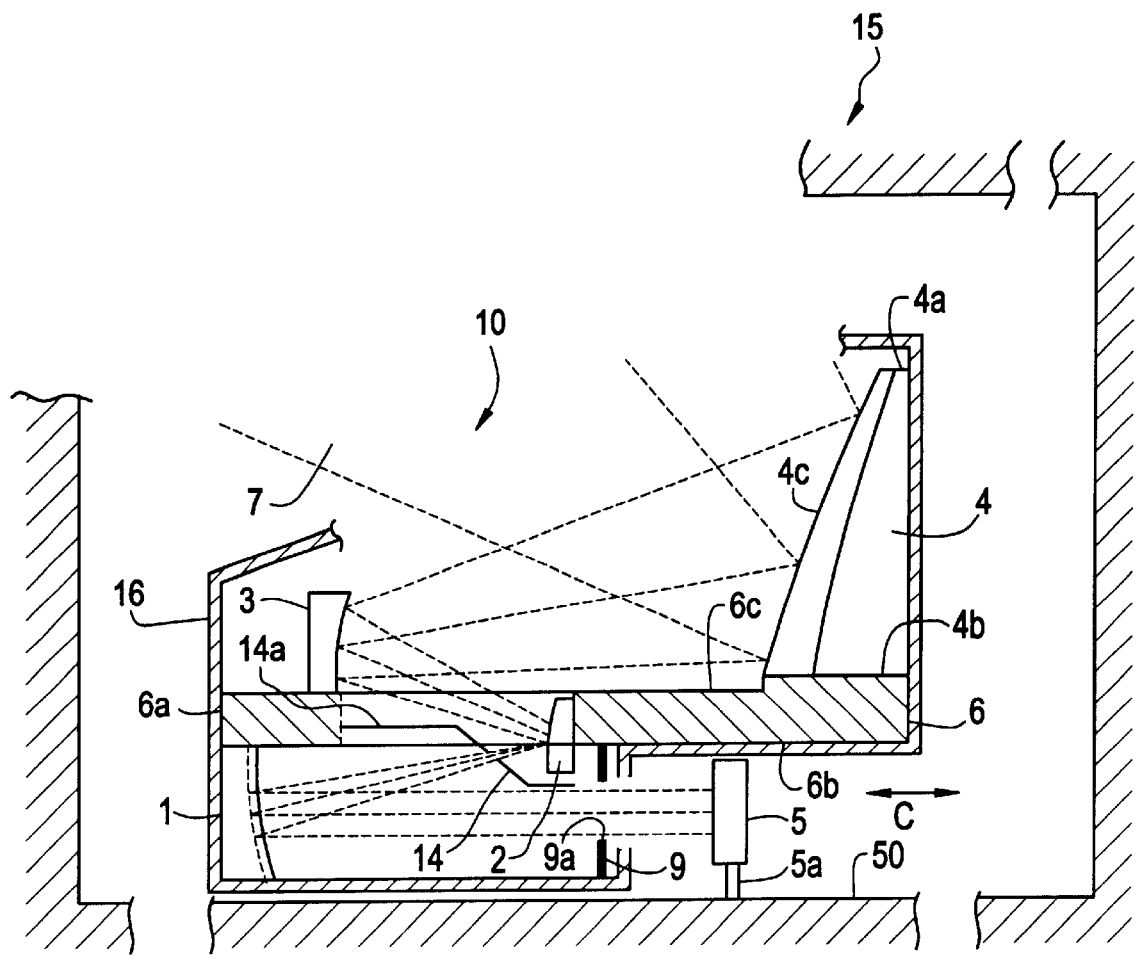
FIG. 2 is a cross schematic of a projector system including a section of a projecting optical system according to the present invention.
Figure 2A:
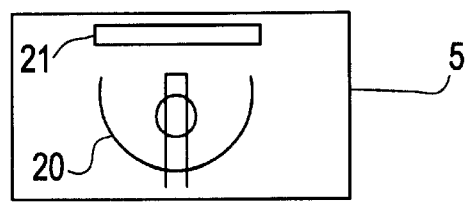
FIG. 2A is a schematic perspective of an image forming component.

A projector 15 according to the present invention includes a projecting optical system for projecting light from an image-forming element 5 onto a screen, which corresponds to the screen 24 shown in FIG. 1A, as shown in FIG. 2. One embodiment of an image-forming element 5 comprises a light source 20 and liquid crystal display panel 21. See FIG. 2A.

As shown in FIG. 2, all of optical elements 1 to 4, that constitute the projecting optical system, are constituted with reflection mirrors, respectively. All optical elements are fixed to a plate-shaped support member 6 so that a position of the whole projecting optical system 10 can be adjusted with respect to the image-forming element 5 by moving the support member 6 against the image-forming element 5 in a direction C. The image-forming element 5 is supported on a housing member 50 by a support member 5a.

The position of the whole projecting optical system is adjusted with respect to the screen by moving the support member 6 without changing the relative positional relation between the optical elements. Thus, no error as a result of the arrangement of the respective optical elements, that is, the distances between adjacent ones of the optical elements, occurs when the focal point adjustment is performed. Accordingly, it is possible to manage the mounting reference of the respective optical elements by means of only the support member 6 and to eliminate the necessity of positional adjustment of the optical elements after the optical elements are assembled on the support member 6.

Furthermore, since all optical elements 1 to 4 are mounted on the support member 6 as a unit, it is possible to eliminate the angle error of the optical elements by using an angle of a rear surface of one of the optical elements or a reference-mounting surface of one of the optical elements as an angle reference.

Moreover, all of the optical elements 1 to 4, which constitute the focusing optical system, can be moved without changing the relative positional relation between the optical elements. Therefore, it is possible to easily perform the focus adjustment without positional deviation or tilting of the respective optical elements. described with reference to FIG. 2.

As shown in FIG. 2, the projecting optical system according to the first embodiment of the present invention is constituted with a combination of four reflection mirrors 1 to 4. The reflection mirrors 1 and 3 are concave mirrors, respectively, and the reflection mirrors 2 and 4 are convex mirrors, respectively.

The reflection mirror 1 is arranged in front of an image-forming element 5 on a lower surface of a plate-shaped support member 6, which is to be fixedly housed in a casing 16. The reflection mirrors 3 and 4 are arranged on an upper surface 6c of the support member 6. The reflection mirror 2 is arranged in an opening portion 6a formed in the support member 6. The reflection mirror 1 reflects a light beam from the image-forming element 5 toward the reflection mirror 2. The reflection mirror 2 reflects a light beam from the reflection mirror 1 toward the reflection mirror 3. The reflection mirror 3 reflects a light beam from the reflection mirror 2 toward the reflection mirror 4. The reflection mirror 4 projects a light beam reflected from the reflection mirror 3 onto the screen, which corresponds to the screen 24 shown in FIG. 1A, as a projection light 7. All of the reflection mirrors 1 to 4 are mounted on the plate-shaped support member 6 such that their relative positions are fixed to each other.

Furthermore, as shown in FIG. 2, a light shield portion 9 for limiting the light beam from the image-forming element 5 to an effective light beam is provided on the side of a lower surface 6b of the support member 6. The light shield portion 9 is in a form of a plate having an opening 9a at its center.

A stray light component of the light beam from the image-forming element 5 can be removed by passing the light beam from the image-forming element 5 through the opening 9a to thereby prevent a degradation of an image due to stray light.

Moreover, an iris portion 14 for removing useless light contained in the light beam in the projecting optical system is provided in the plate-shaped support member 6. The iris portion 14 is provided in an incident light path to the reflection mirror 2 of the projecting optical system and functions to remove a useless portion of the light beam reflected by the reflection mirror 1 preceding the reflection mirror 2.

The structure for fixing the reflection mirrors on the support member 6 will be described with reference to the reflection mirror 4 shown in FIG. 2. The reflection mirror 4 shown in FIG. 2 takes in a generally trapezoidal configuration having a upper side 4a smaller than a bottom side 4b and a convex mirror surface 4c, which reflects the light beam from the preceding reflection mirror 3 onto the screen as the projecting light.

Figure 3:
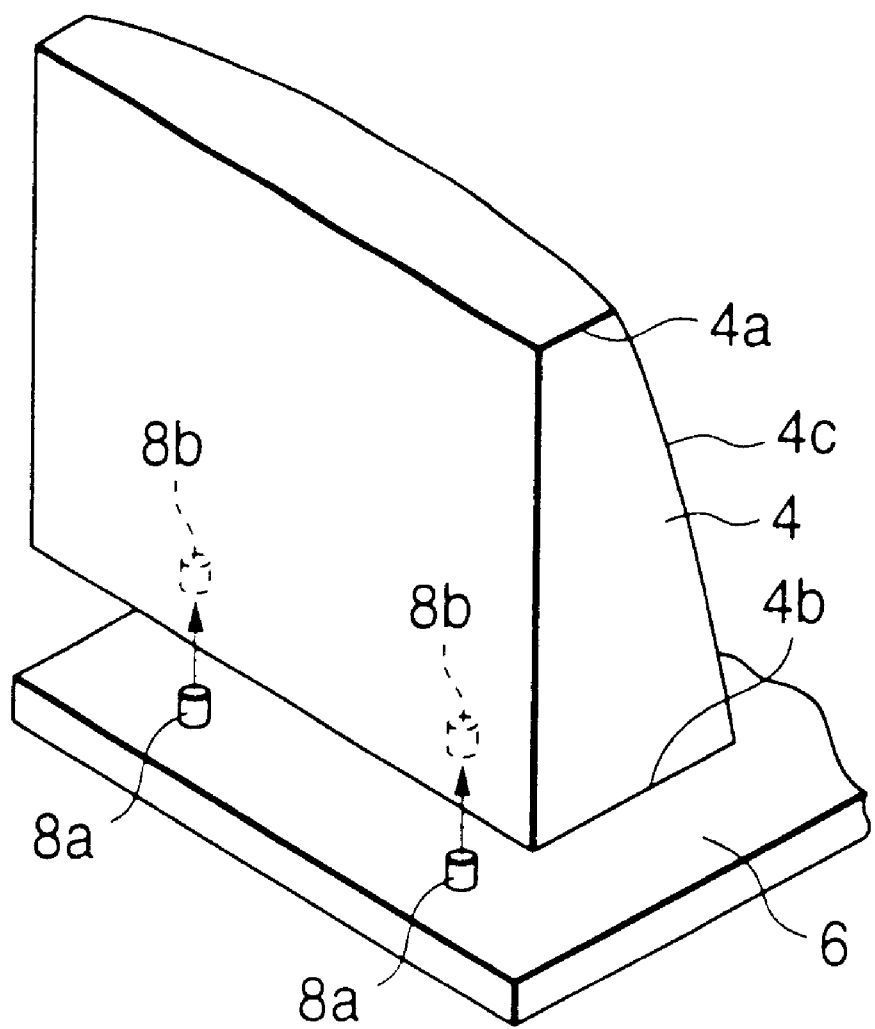
FIG. 3 is a perspective view of a first embodiment of the present invention.

In the first embodiment of the fixing structure of the reflection mirror shown in FIG. 3, a pair of reference pins 8a is provided in positions on the upper surface 6c of the support member 6 at which the reflection mirror 4 is to be fixed. A pair of reference holes 8b is formed in corresponding positions on the bottom surface of the reflection mirror 4 to the positions of the respective reference pins 8a on the support member 6. The reflection mirror 4 is mounted on the support member 6 by fitting the reference pins 8a in the reference holes 8b of the reflection mirror 4 with the relative positional relation between the reflection mirror 4 and the other reflection mirrors fixedly mounted on the support member 6 being fixed similarly.

That is, although the fixing structure is described by Preferring to only the reflection mirror 4, the reflection mirrors 1 to 3 are also fixed in positions of the support member 6 by using reference holes 8b formed therein and reference pins 8a formed in the support member 6, respectively. In this case, the focus adjustment can be performed while maintaining the perpendicularity and the parallelism of the reflection mirrors 1 to 4 and the reference pins 8a within 1 minute.

As shown in FIG. 2 and FIG. 3, light from the image-forming element 5 is incident on the reflection mirror 1 and reflected thereby to the reflection mirror 2 by which light is reflected from the side of the lower surface 6b of the support member 6 to the side of the upper surface 6c through the opening portion 6a of the support member 6. The thus reflected light is projected onto the screen corresponding to the screen 24 shown in FIG. 1A by the reflection mirrors 3 and 4 on the surface 6c of the support member 6.

In order to adjust the focus of the projecting optical system, the casing housing 16 of the support member 6 is moved with respect to the image-forming component 5 while maintaining the relative positional relation and the distances between the reflection mirrors 1 to 4 as they are.

As described, according to this embodiment of the present invention in which all of the reflection mirrors are fixedly arranged on the single plate-shaped support member with the relative positional relation between the reflection mirrors being fixed, a reference plane between the mutual reflection mirrors can be easily set, so that the angle error and the arranging error of the reflection mirrors can be removed easily.

Furthermore, in order to give full performance of the projecting optical system, it is necessary to perform the focus adjustment by moving the whole projecting optical system. In the present invention, it is possible to easily perform the focus adjustment while the precision of arrangement and angles of the respective reflection mirrors are kept high by moving only the casing 16 in which the plate-shaped support member is fixedly housed.

Furthermore, in a case of an optical system in which effective light is reflected by reflection mirrors repeatedly, the effective light may be blocked when stray component of the effective light is removed within the optical system. According to the present invention, however, it is possible to easily mount the light shield portion 9 for removing stray light on the support member 6, so that it is possible to prevent the image degradation due to stray light. Furthermore, since it is possible to easily provide the iris portion 10 for removing useless light contained in the light beam reflected by the reflection mirror 1 between the reflection mirrors 1 and 2, the useless light can be removed easily.

Figure 4:
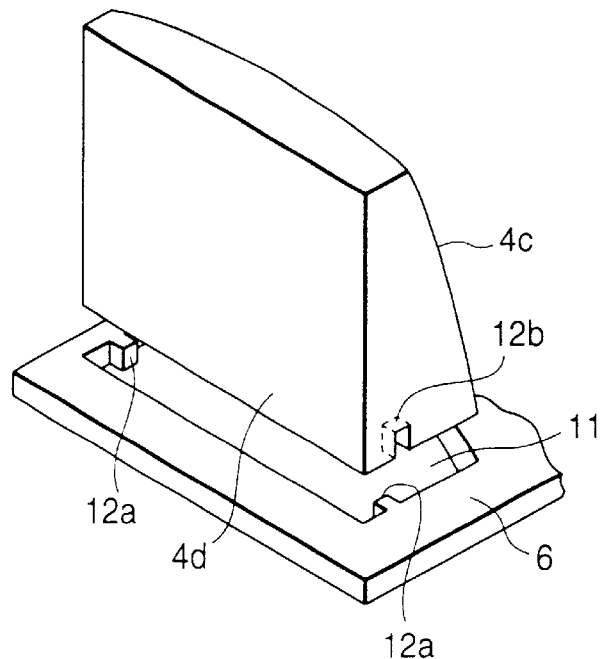
FIG. 4 is a perspective view of a second embodiment of the present invention.

FIG. 4 is a perspective view of a second embodiment of the present invention. Although, in the first embodiment shown in FIG. 3, the reflection mirrors 1 to 4 are fixed to the plate-shaped support member 6 with the relative positional relation between the reflection mirrors being fixed by using the combination of the reference pins and the reference holes, the reflection mirrors are fixed to the plate-shaped support member without using reference pins in the second embodiment shown in FIG. 4.

In the second embodiment shown in FIG. 4, a fitting hole 11 having a contour corresponding to that of a fitting portion 4d of the reflection mirror 4 is formed in the upper surface 6b of the plate-shaped support member 6. The fitting hole 11 has a pair of protrusions 12a formed on mutually opposing side surfaces thereof and corresponding recesses 12b are formed in the fitting portion 4d of the reflection mirror 4. The reflection mirror 4 is fixed to the support member 6 by inserting the fitting portion 4d of the reflection mirror 4 into the fitting hole 11 of the support member 6 so that the protrusions 12a of the fitting hole 11 are received in the recesses 12a of the reflection mirror 4.

Although the fixing structure is described by referring to only the reflection mirror 4, the reflection mirrors 1 to 3 are also fixed in positions of the support member 6 by using fitting holes 11 formed therein and recesses formed in fitting portions of the respective reflection mirrors 1 to 3. The support member 6 on which the reflection mirrors 1 to 4 are arranged with the relative positional relation therebetween being fixed is fixedly arranged in the casing.

Figure 5:
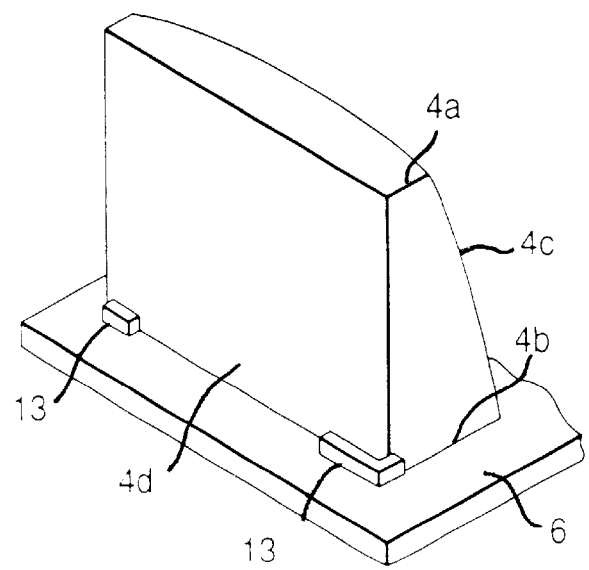
FIG. 5 is a perspective view of a third embodiment of the present invention.

FIG. 5 is a perspective view of a third embodiment of the present invention. In the third embodiment shown in FIG. 5, a pair of abutments 13 is formed on the upper surface 6c of the plate-shaped support member 6 to fix a peripheral portion of the fitting portion 4d of the reflection mirror 4 in place.

Although the fixing structure is described by referring to only the reflection mirror 4, the reflection mirrors 1 to 3 are also fixed in positions of the support member 6 by using abutments formed therein. The support member 6 on which the reflection mirrors 1 to 4 are arranged with the relative positional relation therebetween being fixed is fixedly arranged in the casing.

According to the embodiments shown in FIG. 4 and FIG. 5, the same effect as that obtained by the embodiment shown in FIG. 3 can be obtained.

As described hereinbefore, according to the present invention, the adjustment of the position of the whole projecting optical system with respect to the screen can be performed by moving the casing with the relative positional relation between all of the reflecting optical elements being fixed. Therefore, there is no error of the arrangement of and distances between the reflective optical elements, which may occur during the focus adjustment. Consequently, it is possible to manage the mounting reference of the respective reflective optical elements by means of the single casing and to remove the necessity of positional adjustment of the reflective optical elements after they are assembled.

Although the casing 16 in which the support member 6 is fixedly housed is made movable in the described embodiments, it is possible to fix the plate-shaped support member 6 to the housing member 50 and to make the image-forming component 5 movable.

What is claimed is:

1. A projector comprising:
an image-forming component;
a projecting optical system for projecting light from said image-forming component onto a screen, all of a plurality of optical elements constituting said projecting optical system being reflective optical elements; and
a support member for supporting all of said reflective optical elements such that a relative positional relation among said reflective optical elements is fixed, said support member being arranged so as to be moved against said image-forming component without changing a relative position of said plurality of optical elements;
wherein one of said reflective optical elements and said support member is provided with a reference hole, another one of said support member and said reflective optical elements is provided with a reference pin so as to be inserted into said hole.

2. A projector comprising:
an image-forming component;
a projecting optical system for projecting light from said image-forming component onto a screen, all of a plurality of optical elements constituting said projecting optical system being reflective optical elements; and
a support member for supporting all of said reflective optical elements such that a relative positional relation among said reflective optical elements is fixed, said support member being arranged so as to be moved against said image-forming component without changing a relative position of said plurality of optical elements;
wherein said support member is provided with a plurality of fitting holes each having a contour corresponding to a fitting portion of each said reflective optical element such that a relative positional relation between said reflective optical elements is fixed by fitting said fitting portions of said reflective optical elements in said fitting holes, respectively.

3. A projector comprising:
an image-forming component;
a projecting optical system for projecting light from said image-forming component onto a screen, all of a plurality of optical elements constituting said projecting optical system being reflective optical elements; and
a support member for supporting all of said reflective optical elements such that a relative positional relation among said reflective optical elements is fixed, said support member being arranged so as to be moved against said image-forming component without changing a relative position of said plurality of optical elements;

wherein said support member is provided with abutments to fix peripheral portions of fitting portions of said reflection mirrors in place such that a relative positional relation between said reflective optical elements is fixed by abutting said fitting portions of said reflective optical elements to said abutments.

4. A projector comprising:

an image-forming component composed of a light source and a liquid crystal display panel;

a first support member for fixedly supporting said image-forming component;

a second support member movable with respect to said first support member; and a plurality of reflection mirrors fixed on said second support member, with a relative positional relation between said reflection mirrors being fixed;

wherein the plurality of said reflection mirrors are a first concave reflection mirror provided on a lower surface side of said second support member for reflecting light from said image forming component, a first convex reflection mirror provided in an opening portion of said second support member for reflecting light from said first concave reflection mirror, a second concave reflection mirror provided on an upper surface side of said second support member for reflecting light from said first convex reflection mirror and a second convex reflection mirror provided on the upper side of said second support member for reflecting light from said second concave reflection mirror onto said screen.

* * * * *